(12) United States Patent
Lin et al.

(10) Patent No.: US 11,034,600 B2
(45) Date of Patent: Jun. 15, 2021

(54) WATER TREATMENT SYSTEM

(71) Applicant: MEGA UNION TECHNOLOGY INC., Taoyuan (TW)

(72) Inventors: Kuo-Ching Lin, Taoyuan (TW); Yung-Cheng Chiang, Taoyuan (TW); Shr-Han Shiu, Taoyuan (TW); Chieh-Yao Hou, Taoyuan (TW)

(73) Assignee: MEGA UNION TECHNOLOGY INC., Taoyuan (TW)

( * ) Notice: Subject to any disclaimer, the term of this patent is extended or adjusted under 35 U.S.C. 154(b) by 180 days.

(21) Appl. No.: 16/507,548

(22) Filed: Jul. 10, 2019

(65) Prior Publication Data
US 2020/0247697 A1 Aug. 6, 2020

(30) Foreign Application Priority Data

Feb. 1, 2019 (TW) .................................. 108104228

(51) Int. Cl.
 *C02F 1/72* (2006.01)
 *C02F 1/58* (2006.01)
 *C02F 101/38* (2006.01)

(52) U.S. Cl.
 CPC ................ *C02F 1/725* (2013.01); *C02F 1/58* (2013.01); *C02F 2101/38* (2013.01); *C02F 2201/002* (2013.01); *C02F 2305/02* (2013.01)

(58) Field of Classification Search
 None
 See application file for complete search history.

(56) References Cited

U.S. PATENT DOCUMENTS

| | | | | |
|---|---|---|---|---|
| 3,215,620 A | * | 11/1965 | Dunning | B01J 20/22 210/638 |
| 4,144,145 A | * | 3/1979 | Watanabe | B01D 61/44 205/557 |
| 5,021,154 A | * | 6/1991 | Haegeman | B01F 3/04773 210/221.2 |
| 5,814,224 A | * | 9/1998 | Khamizov | B01J 49/06 210/638 |
| 6,066,257 A | * | 5/2000 | Venkatesh | C02F 1/42 210/615 |
| 2002/0121484 A1 | * | 9/2002 | Arai | B01D 21/286 210/723 |
| 2002/0170853 A1 | * | 11/2002 | Alexander | C02F 1/76 210/167.11 |
| 2010/0187175 A1 | * | 7/2010 | Kolios | C01B 11/20 210/638 |
| 2016/0068417 A1 | * | 3/2016 | Buschmann | C02F 1/72 210/663 |

* cited by examiner

*Primary Examiner* — Krishnan S Menon
*Assistant Examiner* — Brad Gordon
(74) *Attorney, Agent, or Firm* — Muncy, Geissler, Olds & Lowe, P.C.

(57) ABSTRACT

A water treatment system is provided with a nitrogen-containing organic compound oxidizing device that treats the first-stage treatment water after filtration and removal of cation ions. An oxidant-containing water stream and an inorganic bromide-containing water stream are respectively added into a pipeline that conducts the first-stage treatment water and then pass through an in-pipe mixer and a mixing unit, whereby to oxidize the nitrogen-containing organic compounds in the first-stage treatment water and then form the second-stage treatment water for output.

11 Claims, 1 Drawing Sheet

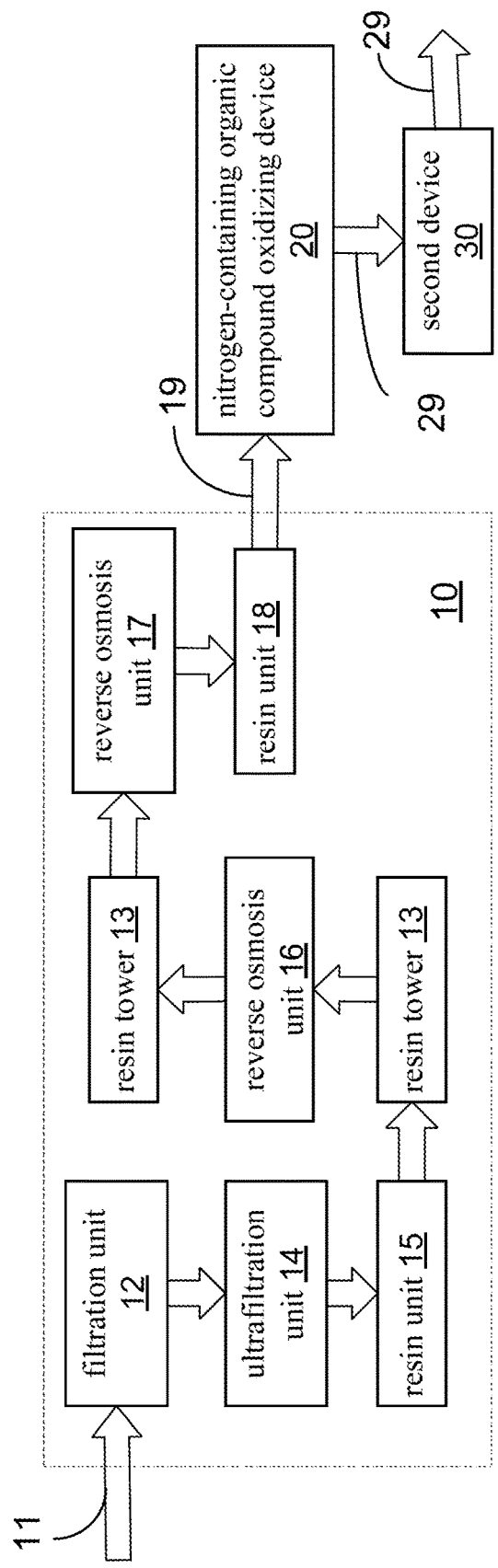

WATER TREATMENT SYSTEM

BACKGROUND OF THE INVENTION

1. FIELD OF THE INVENTION

The present invention relates to water treatment, particularly to a water treatment system and method for removing nitrogen-containing organic compounds.

2. DESCRIPTION OF THE PRIOR ART

Water resources become more and more precious nowadays. Treatment of used water (waste water) and raw water thus grows more and more important. Used water and raw water normally has nitrogen-containing organic compounds. Nitrogen-containing organic compounds impair utilization and reutilization of water and thus must be eliminated.

SUMMARY OF THE INVENTION

A water treatment system is equipped with a nitrogen-containing organic compound oxidizing device to oxidize nitrogen-containing organic compounds, particularly urea, wherein hypobromite for oxidizing urea is fully formed via two stages of mixing operations.

To achieve the abovementioned objective, the present invention proposes a water treatment system, which includes a first device, a nitrogen-containing organic compound oxidizing device, and a second device. The nitrogen-containing organic compound oxidizing device further comprises a pipeline, an oxidant input tube, an inorganic bromide input tube, a mixing unit, and a reflux tube. A raw water is input into the first device and passes through at least one of a cation filtering treatment and a cation removing treatment in the first device to form a first-stage treatment water. The first-stage treatment water is input into the nitrogen-containing organic compound oxidizing device and passes through a nitrogen-containing organic compound removing treatment in the nitrogen-containing organic compound oxidizing device to form a second-stage treatment water. The pipeline of the nitrogen-containing organic compound oxidizing device includes an in-pipe mixer. The pipeline conducts the first-stage treatment water into the in-pipe mixer. The oxidant input tube joins the pipeline. An oxidant-containing water stream is conducted to the pipeline via the oxidant input tube, and the oxidant-containing water stream passes through the in-pipe mixer. The inorganic bromide input tube joins the pipeline. An inorganic bromide-containing water stream is conducted to the pipeline via the inorganic bromide input tube, and the inorganic bromide-containing water stream passes through the in-pipe mixer. The in-pipe mixer mixes the first-stage treatment water, the oxidant-containing water stream, and the inorganic bromide-containing water stream. The mixing unit joins the pipeline to mix the first-stage treatment water, the oxidant-containing water stream, the inorganic bromide-containing water stream and a portion of the second-stage treatment water. The reflux tube joins the mixing unit and passes a portion of the second-stage treatment water back to the mixing unit.

The second-stage treatment water flows into the second device, collected for inspection in the second device, and then output from the second device. The concentration of the nitrogen-containing organic compounds in the second-stage treatment water is lower than that in the first-stage treatment water.

In one embodiment, the oxidant input tube is disposed at the upstream and the downstream of the inorganic bromide input tube.

In one embodiment, the nitrogen-containing organic compounds in the first-stage treatment water include urea at a concentration of 50-500 µg/L.

In one embodiment, the nitrogen-containing organic compounds in the second-stage treatment water include urea at a concentration of less than 50 µg/L.

In one embodiment, the nitrogen-containing organic compounds of the second-stage treatment water include urea at a concentration of a range from 5 to 50 µg/L.

Below, embodiments are described in cooperation with the attached drawings to make easily understood the objectives, technical contents, characteristics and accomplishments of the present invention.

BRIEF DESCRIPTION OF THE DRAWINGS

FIG. 1 is a diagram schematically showing the layout of units of a water treatment system according to one embodiment of the present invention; and FIG. 2 is a diagram schematically showing the layout of a nitrogen-containing organic compound oxidizing device of a water treatment system according to one embodiment of the present invention.

DESCRIPTION OF THE PREFERRED EMBODIMENTS

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1. The water treatment system of the present invention includes a first device 10, a nitrogen-containing organic compound oxidizing device 20, and a second device 30. A raw water 11 is input into the first device 10 and passes through a cation filtering treatment and/or a cation removing treatment in the first device 10 to form a first-stage treatment water 19. The first-stage treatment water 19 is input into the nitrogen-containing organic compound oxidizing device 20 and passes through a nitrogen-containing organic compound removing treatment in the nitrogen-containing organic compound oxidizing device 20 to generate a second-stage treatment water 29. The second-stage treatment water 29 flows into the second device 30, collected for inspection in the second device 30, and then output from the second device 30. In the present invention, the first device 10 may include all the units disposed in the upstream of the nitrogen-containing organic compound oxidizing device 20, and the second device 30 is arranged in the downstream of the nitrogen-containing organic compound oxidizing device 20. The first device 10 includes the units for filtering, cation removing, and raw water storage. The second device 30 just samples the second-stage treatment water 29 for inspection without any water processing function.

Refer to FIG. 1 again. The raw water 11 is the waste water generated in a special process, which may be but is not limited to be a semiconductor process for fabricating semiconductor. The first device 10 may include a filtering unit, a storage unit, and an ion processing unit. As shown in FIG. 1, in one embodiment, the filtering unit includes a filtration unit 12 and an ultrafiltration unit 14; the storage unit includes one or more resin towers 13; the ion processing unit includes a cation exchange resin unit 15, a reverse osmosis unit 16, a reverse osmosis unit 17, and a resin unit 18. In one embodiment, the filtration unit 12 is an automatic-cleaning filtration device to perform continuous filtration for impurities and particles in the raw water by passing the raw water 11 through the stainless steel network having special apertures where the impurities and particles in the raw water 11 adhering to the stainless steel network are scraped out by a rotating scraper. In one embodiment, the ultrafiltration unit 14 contains filter mesh having apertures of 0.1-0.003 μm to filter the fluid with particles smaller than the apertures of the filtration unit 12 from the filtration unit 12 by enforcing filtering pressure by a pump on the fluid to pass through the ultrafiltration unit 14, whereby the particles smaller than the apertures of the filtration unit 12 is removed in the ultrafiltration unit 14. The cation exchange resin unit 15 can undertake cation exchange, and the functional groups on the specialized resin surface has weak acidity, which can be used to remove cations in water. The resin tower 13 is a water supply tank where water may stay for 15-30 minutes for regulating water supply lest the operation of the system be interrupted. In the reverse osmosis unit 16 and the reverse osmosis unit 17, pumps pressurize water to overcome osmotic pressure and pass through reverse osmosis membranes. Each of the reverse osmosis unit 16 and the reverse osmosis unit 17 has a two-stage reverse osmosis process to increase water yield. The resin unit 18 includes a resin having high affinity to boric acid ion and using the functional groups on the specialized surface of the resin to remove boric acid ions in water, whereby the concentration of the boric acid ions in the first-stage treatment water 19 is lower than a specified level; then the first-stage treatment water 19 is output. The second device 30 includes a sorting tank; the second-stage treatment water 29 is collected for inspection herein and then pumped out.

Refer to FIG. 1 again. The first-stage treatment water 19, which is output by the first device 10, enters the nitrogen-containing organic compound oxidizing device 20, and urea is decomposed in the nitrogen-containing organic compound oxidizing device 20. The first-stage treatment water 19 passing through the first device 10, has a urea concentration of 50-500 μg/L. The second-stage treatment water 29 output from the nitrogen-containing organic compound oxidizing device 20, has a urea concentration of lower than 50 μg/L, and preferably has the urea concentration in the range of 5~50 μg/L. The first device 10 undertakes filtering and cation removing treatments for the raw water 11. The units of the first device 10 shown in FIG. 1 are only for exemplification. The sequence (positions in the upstream or downstream of the other units) and quantities of these units may be varied according to practical requirement, such as the water quality of the raw water 11.

Refer to FIG. 2. FIG. 2 is a diagram schematically showing the layout of the nitrogen-containing organic compound oxidizing device 20 according to one embodiment of the present invention. The nitrogen-containing organic compound oxidizing device 20 includes an inorganic bromide input tube 21, an oxidant input tube 23, an in-pipe mixer 22, a mixing unit 24, a reflow tube 26, and a circulation pump 28. In one embodiment, at an upstream where the first-stage treatment water 19 is fed into the in-pipe mixer 22 via a pipeline 27, the inorganic bromide input tube 21 and the oxidant input tube 23 are respectively joint to the pipeline 27. The inorganic bromide input tube 21 conducts an inorganic bromide-containing water stream from a far end (not shown in the drawings) to the first-stage treatment water 19 in the pipeline 27. The oxidant input tube 23 conducts an oxidant-containing water stream from a far end (not shown in the drawings) to the first-stage treatment water 19 in the pipeline 27. Inorganic bromides are formed by dissolving inorganic bromine compounds in water, such as alkaline metal bromides, alkaline earth bromides and combinations thereof, and sodium bromide is preferred. Oxidants are used to oxidize bromide ions of inorganic bromide compounds, such as ozone and sodium hypochlorite, and sodium hypochlorite is preferred. In the present invention, inorganic bromides react with oxidants to form hypobromites. Hypobromites react with the nitrogen-containing organic compounds in the first-stage treatment water 19, especially urea, to form molecular nitrogen and carbon dioxide. Thus, the nitrogen-containing organic compounds are removed in form of gases finally. The arrangement of disposing the inorganic bromide input tube 21 and the oxidant input tube 23 in the pipeline 27 is not limited by that shown in FIG. 2. In the present invention, the upstream-downstream relationship of the inorganic bromide input tube 21 and the oxidant input tube 23 in the pipeline 27 is allowed to be changed.

Refer to FIG. 2 again. In order to let hypobromites fully react with the nitrogen-containing organic compounds in the first-stage treatment water 19, the first-stage treatment water 19 together with the inorganic bromides and oxidants enters the in-pipe mixer 22 for a first-stage mixing process, wherein the stoichiometric ratio of the hypobromites and the urea in the first-stage treatment water 19 is greater than 50. Next, the water stream flowing out of the in-pipe mixer 22 enters into the mixing unit 24. The mixing unit 24 is a sucking type mixer for performing a second-stage mixing. A portion of the second-stage treatment water 29 flowing out of the mixing unit 24 is conducted to the reflow tube 26 and pressurized by the circulation pump 28 back to the mixing unit 24 for the second-stage mixing once again. The present invention uses multi-stage mixing pipes/devices and feedback processes to solve the problem that inorganic bromides and oxidants, which are added to the treated water, are diluted. The conventional technology uses a design that hypobromites are generated and stored in the storage columns beforehand. However, the reaction activity of hypobromites is very high. Hence, the efficacy of storing hypobromites is very limited. Because the half-life of hypobromites is very short, the material for generating hypobromites in the storage columns must be increased. In comparison with the conventional design using the storage columns to preserve hypobromites, the present invention adopts a design that an in-pipe mixer 22, a mixing unit 24, and a reflow tube 26 are disposed inside the pipeline 27. In the design of the present invention, the addition and mixing of reagents are performed in real time to generate hypobromites, and circulation mixing is used to enhance the reaction of hypobromites and urea, whereby the usage of reagents is decreased. Therefore, the nitrogen-containing organic compound oxidizing device 20 has the advantages of less reagents and higher efficiency, which the conventional technology is unlikely to achieve.

What is claimed is:

1. A water treatment system comprising:
    a first device and a raw water input into the first device, wherein the raw water passes through at least one of a filtering process and a cation removing treatment in the first device to form a first-stage treatment water;
    a nitrogen-containing organic compound oxidizing device and the first-stage treatment water input into the nitrogen-containing organic compound oxidizing device, wherein the first-stage treatment water passes through a nitrogen-containing organic compound removing treatment in the nitrogen-containing organic compound oxidizing device to form a second-stage treatment water, and the nitrogen-containing organic compound oxidizing device comprises:
        a pipeline including an in-pipe mixer and conducting the first-stage treatment water to the in-pipe mixer;
        an oxidant input tube joining the pipeline and conducting an oxidant-containing water stream to the pipeline to let the oxidant-containing water stream pass through the in-pipe mixer;
        an inorganic bromide input tube joining the pipeline and conducting an inorganic bromide-containing water stream to the pipeline to let the inorganic bromide-containing water stream pass through the in-pipe mixer, wherein the in-pipe mixer mixes the first-stage treatment water, the oxidant-containing water stream, and the inorganic bromide-containing water stream;
        a mixing unit joining the pipeline and mixing the first-stage treatment water, the oxidant-containing water stream, the inorganic bromide-containing water stream, and a portion of the second-stage treatment water, and outputting the second-stage treatment water; and
        a reflow tube joining the mixing unit and conducting a portion of the second-stage treatment water back to the mixing unit; and
    a second device and the second-stage treatment water input into the second device, collected for inspection, and then output, wherein a concentration of nitrogen-containing organic compounds in the second-stage treatment water is lower than that in the first-stage treatment water.

2. The water treatment system according to claim 1, wherein the nitrogen-containing organic compound oxidizing device further includes a circulation pump, which is disposed in the reflow tube to pressurize a portion of the second-stage treatment water back to the mixing unit.

3. The water treatment system according to claim 1, wherein the mixing unit includes a sucking type mixer.

4. The water treatment system according to claim 1, wherein the first device includes a cation exchange resin unit.

5. The water treatment system according to claim 1, wherein the first device includes a reverse osmosis unit.

6. The water treatment system according to claim 1, wherein the oxidant-containing water stream includes a sodium hypochlorite water stream.

7. The water treatment system according to claim 1, wherein the inorganic bromide-containing water stream includes a sodium bromide water stream.

8. The water treatment system according to claim 1, wherein the oxidant input tube is disposed in an upstream and a downstream of the inorganic bromide input tube.

9. The water treatment system according to claim 1, wherein the nitrogen-containing organic compounds of the first-stage treatment water include urea at a concentration of 50-500pg/L.

10. The water treatment system according to claim 1, wherein the nitrogen-containing organic compounds of the second-stage treatment water include urea at a concentration of lower than 50 µg/L.

11. The water treatment system according to claim 1, wherein the nitrogen-containing organic compounds of the second-stage treatment water include urea at a concentration of a range from 5 to 50 µg/L.

* * * * *